United States Patent [19]
Watanabe et al.

[11] Patent Number: 5,989,515
[45] Date of Patent: Nov. 23, 1999

[54] PROCESS FOR PRODUCING AN ACIDIC AQUEOUS ALUMINA SOL

[75] Inventors: Yoshitane Watanabe; Yoshiyuki Kashima; Kiyomi Ema, all of Funabashi, Japan

[73] Assignee: Nissan Chemical Industries, Ltd., Tokyo, Japan

[21] Appl. No.: 08/897,084

[22] Filed: Jul. 18, 1997

[30] Foreign Application Priority Data

Jul. 24, 1996 [JP] Japan ................................ 8-194376

[51] Int. Cl.[6] .............................. C01F 7/02; C04B 35/10; B01J 20/00
[52] U.S. Cl. ...................... 423/625; 423/600; 423/626; 423/627; 501/153; 502/414; 502/415
[58] Field of Search ..................... 423/625, 626, 423/627, 600; 501/153; 502/414, 415

[56] References Cited

U.S. PATENT DOCUMENTS

| | | |
|---|---|---|
| 2,915,475 | 12/1959 | Bugosh . |
| 3,839,536 | 10/1974 | Sato et al. . |
| 4,211,667 | 7/1980 | Yamada et al. . |
| 4,344,928 | 8/1982 | Dupin et al. . |
| 4,492,682 | 1/1985 | Trebillon . |
| 4,797,139 | 1/1989 | Bauer . |
| 5,178,849 | 1/1993 | Bauer ...................... 423/626 |
| 5,244,648 | 9/1993 | Dupin et al. ............. 423/626 |
| 5,306,680 | 4/1994 | Fukuda ..................... 501/153 |
| 5,407,600 | 4/1995 | Ando et al. . |
| 5,445,807 | 8/1995 | Pearson .................... 423/625 |
| 5,531,976 | 7/1996 | Decker, Jr. et al. ...... 423/625 |
| 5,580,539 | 12/1996 | Mercier ................... 423/626 |

FOREIGN PATENT DOCUMENTS

| | | |
|---|---|---|
| 015196 | 9/1980 | European Pat. Off. . |
| 085592 | 8/1983 | European Pat. Off. . |
| 40-14292 | 7/1940 | Japan . |
| 40-14292 | 7/1965 | Japan . |
| 45-3658 | 2/1970 | Japan . |
| 54-116398 | 9/1979 | Japan . |
| 55-23034 | 2/1980 | Japan . |
| 55-27824 | 2/1980 | Japan . |
| 55-116622 | 9/1980 | Japan . |
| 58-176123 | 10/1983 | Japan . |
| 60-166220 | 8/1985 | Japan . |
| 5-24824 | 2/1993 | Japan . |

OTHER PUBLICATIONS

Poisson et al.: "Alumina", Catalyst Supports and Supported Catalysts, pp. 11–55, Jan. 1, 1987.

"American Ceramic Society Bulletin, vol. 54, No. 3, pp 289–290, (1975)".

*Primary Examiner*—Gary P. Straub
*Assistant Examiner*—Cam N. Nguyen
*Attorney, Agent, or Firm*—Oliff & Berridge, PLC

[57] ABSTRACT

A process for producing a stable acidic aqueous alumina sol containing 50 to 300 nm of elongate secondary particles which are elongated in only one plane and formed by edge-to-edge coagulation of rectangular plate-like primary particles having a length of one side of 10 to 30 nm when observed through an electron microscope, the process comprises the steps of:

(A) adding an alkali to an aqueous alumina sol containing fibrous colloidal particles of an amorphous alumina hydrate to produce a reaction mixture having a pH of 9 to 12, (B) subjecting the reaction mixture obtained in the step (A) to a hydrothermal treatment at a temperature of 110 to 250° C. to produce an aqueous suspension containing an alumina hydrate having a boehmite structure, and (C) desalting the aqueous suspension obtained in the step (B) by adding water and an acid by ultrafiltration to form an acidic aqueous alumina sol having a pH of 3 to 6.

19 Claims, No Drawings

PROCESS FOR PRODUCING AN ACIDIC AQUEOUS ALUMINA SOL

BACKGROUND OF THE INVENTION

1. Field of the Invention

The present invention relates to a process for producing a stable acidic aqueous alumina sol containing 50 to 300 nm of elongate secondary particles which are elongated in only one plane and formed by edge-to-edge coagulation of rectangular plate-like primary particles having a length of one side of 10 to 30 nm when observed through an electron microscope.

The present invention also relates to a process for producing a stable acidic aqueous alumina sol containing colloidal particles of an alumina hydrate having a boehmite structure.

2. Description of the Related Art

Various colloidal particles of alumina hydrates have already been produced by various processes for production. Most of these produced colloidal particles are composed of alumina hydrates having a boehmite structure or pseudoboehmite structure, or amorphous alumina hydrates, and it is known that they are plate-like, ribbon-like, spindle-like, needle-like or fibrous in shape.

Japanese Patent Laid-open Nos. Sho 54-116398, Sho 55-23034 and Sho 55-27824 disclose a process for producing an aqueous alumina sol containing plate-like colloidal particles of an alumina hydrate having a boehmite structure, which comprises reacting a basic aluminum salt with an acid or alkali or reacting an acidic aluminum salt with an alkali to obtain an alumina gel and peptizing the alumina gel with an acid.

Japanese Patent Laid-open No. Sho 55-116622 discloses a process for producing a suspension containing alumina hydrate particles having a boehmite structure and various shapes such as plate-like, ribbon-like and fibrous shapes, which comprises treating poorly crystallized and/or amorphous activated alumina powder in an aqueous medium having a pH of 9 or less at a temperature of 120 to 225° C.

Japanese Patent Laid-open No. Sho 58-176123 discloses a process for producing a suspension containing alumina hydrate particles having a pseudoboehmite structure or boehmite structure and various shapes such as plate-like, ribbon-like and fibrous shapes, which comprises adding an amorphous hydroxy aluminum carbonate gel obtained by reacting a carbon dioxide gas with alkali aluminate to a solution of an acid, base, salt or mixture thereof, adjusting pH of the medium of the resulting mixture to 11 or less, heating it at a temperature of not higher than 90° C. for at least 5 minutes and further heating at a temperature of 90 to 250° C.

A process for producing an alumina sol which comprises hydrolyzing aluminum alkoxide with water and peptizing the obtained slurry with an acid is described in American Ceramic Society Bulletin, Vol. 54, No. 3, pp. 289, 1975, athesis written by B. E. YOLDAS. This process is characterized by hydrolyzing conditions including a temperature of 75° C. and use of water in a proportion of about 100 moles based on 1 mole of the aluminum alkoxide and peptizing conditions including a temperature of not lower than 80° C. and use of hydrochloric acid or nitric acid as a peptizing agent. The obtained sol is a transparent aqueous alumina sol containing plate-like colloidal particles of an alumina hydrate having a boehmite structure.

Japanese Patent Publication No. Sho 45-3658 and Japanese Patent Laid-open No. Sho 60-166220 disclose a process for producing an aqueous alumina sol containing fibrous colloidal particles of an amorphous alumina hydrate, which comprises reacting an aqueous solution of an organic acid with metal aluminum powders under heating.

Japanese Patent Laid-open No. Hei 5-24824 teaches a process for producing an aqueous alumina sol composed of secondary particles having a length 5 to 10 times its thickness, which comprises reacting an aqueous solution of an acid such as a hydrochloric acid with metal aluminum in the presence of a trace amount of silicic acid ions and a trace amount of sulfuric acid ions to produce colloidal particles of an alumina hydrate. The secondary particle consists of an aggregate of fine fibrous primary particles of an amorphous alumina hydrate.

As described above, most of the colloidal particles of alumina hydrates obtained by various processes are composed of aluminate hydrates having a boehmite structure, pseudoboehmite structure or amorphous structure and it is known that they are plate-like, ribbon-like, spindle-like, needle-like or fibrous in shape.

An aqueous alumina sol in which colloidal particles of an alumina hydrate are stably dispersed is used in the surface treatment of fibers and paper, precision casting and the production of binders for refractories and catalysts.

The required physical properties such as viscosity and thixotropic property of the aqueous alumina sol are different according to each application purpose and it is desired to provide a further improved aqueous alumina sol.

SUMMARY OF THE INVENTION

It is therefore an object of the present invention to provide a process for producing easily and efficiently an aqueous alumina sol having a viscosity and thixotropic property which are not attained by a conventional aqueous alumina sol.

According to a first aspect of the present invention, there is provided a process for producing a stable acidic aqueous alumina sol containing 50 to 300 nm of elongate secondary particles which are elongated in only one plane and formed by edge-to-edge coagulation of rectangular plate-like primary particles having a length of one side of 10 to 30 nm when observed through an electron microscope, the process comprising the steps of:

(A) adding an alkali to an aqueous alumina sol containing fibrous colloidal particles of an amorphous alumina hydrate to produce a reaction mixture having a pH of 9 to 12, (B) subjecting the reaction mixture obtained in the step (A) to a hydrothermal treatment at a temperature of 110 to 250° C. to produce an aqueous suspension containing an alumina hydrate having a boehmite structure, and (C) desalting the aqueous suspension obtained in the step (B) by adding water and an acid by ultrafiltration to form an acidic aqueous alumina sol having a pH of 3 to 6.

According to a second aspect of the present invention, there is further provided a process for producing an alumina hydrate having a boehmite structure of the stable acidic aqueous alumina sol containing 50 to 300 nm elongate secondary particles which are elongated in only one plane and formed by edge-to-edge coagulation of rectangular plate-like primary particles having a length of one side of 10 to 30 nm when observed through an electron microscope, the process comprising the steps of:

(a) adding an alkali to an aqueous alumina sol containing fibrous colloidal particles of an amorphous alumina hydrate to produce a reaction mixture having a pH of 9 to 12, (b) subjecting the reaction mixture obtained in the step (a) to a hydrothermal treatment at a temperature of 110 to 250° C. to produce an aqueous suspension containing an alumina hydrate having a boehmite structure, and (c) contacting a hydrogen-type acid cation-exchange resin and a hydroxyl-type strong-base anion-exchange resin to the aqueous suspension obtained in the step (b) to form an acidic aqueous alumina sol having a pH of 3 to 6.

According to a third aspect of the present invention, there is still further provided a process for producing an aluminate hydrate having a boehmite structure of the stable acidic aqueous alumina sol containing 50 to 300 nm of elongate secondary particles which are elongated in only one plane and formed by edge-to-edge coagulation of rectangular plate-like primary particles having a length of one side of 10 to 30 nm when observed through an electron microscope, the process comprising the steps of:

(A') adding an alkali to an aqueous alumina sol containing fibrous colloidal particles of an amorphous alumina hydrate to produce a reaction mixture having a pH of 9 to 12, (B') desalting the reaction mixture obtained in the step (A') by adding water by cake filtration to form a desalted reaction mixture having a pH of 9 to 12, (C') subjecting the desalted reaction mixture obtained in the step (B') to a hydrothermal treatment at a temperature of 110 to 250° C. to produce an aqueous suspension containing an alumina hydrate having a boehmite structure, and (D') adding an acid to the aqueous suspension obtained in the step (C') to form an acidic aqueous alumina sol having a pH of 3 to 6.

According to a fourth aspect of the present invention, there is still further provided a process for producing a high-concentration and stable acidic aqueous alumina sol, the process comprising mechanically dispersing the stable acidic aqueous alumina sol obtained by any one of the above three processes and concentrating the sol.

DETAILED DESCRIPTION OF THE PREFERRED EMBODIMENT

In a process according to a first aspect of the present invention, the aqueous alumina sol containing fibrous colloidal particles of an amorphous alumina hydrate used in the step (A) is easily obtained by a known process for production and can be acquired as a commercially available industrial chemical. Examples of the aqueous alumina sol include aqueous alumina sols obtained by conventionally known processes for producing an aqueous alumina sol which have been mentioned above.

Any aqueous alumina sol having a viscosity of several mPa·s to several hundreds of thousand mPa·s can be used as a starting material if it does not form a gel. An aqueous alumina sol having an $Al_2O_3$ concentration of 2 to 30 wt % and a pH of 2 to 7 is particularly preferred. Since the production of a gel mass or an increase in viscosity may be caused depending on the method for adding an alkali, the concentration of $Al_2O_3$ in the aqueous alumina sol is more preferably adjusted to 2 to 4 wt % in advance when an alkali is added.

An aqueous alumina sol obtained by dissolving a basic aluminum salt and/or an aluminum normal salt containing 5 to 200 parts by weight of $Al_2O_3$ based on 100 parts by weight of $Al_2O_3$ contained in the fibrous colloidal particles of an amorphous alumina hydrate in the aqueous alumina sol is also included in the aqueous alumina sol as a starting material. The object of the present invention is also attained with this aqueous alumina sol.

The basic aluminum salt and/or aluminum normal salt used is easily obtained by a known process for production and acquired as a commercially available industrial chemical. Examples of the basic aluminum salt include water-soluble basic aluminum salts such as basic aluminum chloride, basic aluminum nitrate, basic aluminum acetate, basic aluminum lactate and the like. Examples of the aluminum normal salt used include aluminum chloride, aluminum nitrate, aluminum acetate and the like.

By using an aqueous alumina sol containing an increased weight ratio of a basic aluminum salt and/or aluminum normal salt dissolved, the particle size of the rectangular plate-like primary particles of an alumina hydrate having a boehmite structure obtained by a hydrothermal treatment can be increased. As far as the object of the present invention is attained, an optional component such as anions maintaining the stability of the aqueous alumina sol can be contained.

The reaction mixture of the step (A) is obtained by adding an alkali to the aqueous alumina sol as a starting material in an amount that it shows a pH of 9 to 12, preferably 9 to 11. The obtained reaction mixture is an aqueous slurry.

Illustrative examples of the alkali to be added include alkali metal hydroxides, alkali earth metal hydroxides, alkali metal aluminates, alkali earth metal aluminates, ammonium hydroxide, quaternary ammonium hydroxide, guanidine hydroxide, amines and the like. Out of these, alkali metal hydroxides such as sodium hydroxide, potassium hydroxide and cesium hydroxide are preferred and sodium hydroxide is particularly preferred. An alkali produced from an insoluble salt in the reaction mixture as a by-product is naturally excluded.

To prevent the formation of a big gelated product of an alumina hydrate in the reaction mixture by adding this alkali, an aqueous solution containing 0.01 to 20 wt %, preferably 1 to 5 wt % of an alkali is used. The alkali is preferably added little by little.

In the step (B), the reaction mixture obtained in the step (A) is subjected to a hydrothermal treatment after the completion of the step (A), preferably immediately after the completion of the step (A). If the reaction mixture obtained in the step (A) is left for a long time, it is separated into a gel and an aqueous solution disadvantageously. By this hydrothermal treatment, an aqueous suspension containing an alumina hydrate having a boehmite structure is obtained.

When observed through a transmission electron microscope, 50 to 300 nm elongate secondary particles which are elongated in only one plane and formed by edge-to-edge coagulation of rectangular plate-like primary particles having a length of one side of 10 to 30 nm agglomerate. When the particle size distribution of this aqueous suspension is measured by a dynamic light scattering method, there are a case where particles having a hydrodynamic diameter of 600 to 1,400 nm are observed and another case where both particles having a hydrodynamic diameter of 50 to 400 nm and particles having a hydrodynamic diameter of 600 to 1,400 nm are observed. Through comparison with the results of observation through a transmission electron microscope, it is judged that the particles having a hydrodynamic diameter of 50 to 400 nm are 50 to 300 nm of elongate secondary particles (colloidal particles)

which are elongated in only one plane and formed by edge-to-edge coagulation of rectangular plate-like primary particles (colloidal particles) having a length of one side of 10 to 30 nm and that the particles having a hydrodynamic diameter of 600 to 1,400 nm are high structural aggregates of secondary particles. The proportion of the high structural aggregates of secondary particles is high in this aqueous suspension.

Though the hydrothermal treatment of the step (B) can be carried out at a temperature of 110 to 250° C., it is preferably carried out at 120 to 160° C. when equipment corrosion and costs of pressure-resistant equipment are taken into consideration.

In the hydrothermal treatment, the particle size of rectangular plate-like colloidal primary particles and the thickness of the plate-like particles obtained by the hydrothermal treatment can be further increased by selecting a higher temperature.

As an apparatus for the hydrothermal treatment of the step (B) is used a known high-pressure apparatus such as an autoclave equipped with a stirrer or a flow-type tubular reactor.

In the step (C), the aqueous suspension obtained in the step (B) is treated by ultrafiltration. A diafiltration process which is a variation of ultrafiltration is used for the treatment. In the diafiltration process, the alkali added in the step (A) can be removed by adding water and the content of an acid which is a stabilizer for the aqueous alumina sol can be adjusted by adding an acid, thereby making it possible to smoothly proceed with desalting which is aimed to remove the alkali.

When separation and purification are carried out by extracting the alkali to the side of a solution passing through an ultrafiltration membrane using ultrafiltration, the alkali always remain in the aqueous alumina sol in a batch process. To cope with this, in the diafiltration process used, the amount of the solution passing through the ultrafiltration membrane is increased by adding water and an acid to the aqueous alumina sol while forming an acidic aqueous alumina sol having a pH of 3 to 6, thereby improving the removal rate of the alkali to proceed with desalting efficiently.

This desalting is carried out until electric conductivity falls below 1,000 $\mu$S/cm, preferably 700 to 100 $\mu$S/cm when the concentration of $Al_2O_3$ contained in the acidic aqueous alumina sol is 10 wt %. When the concentration of $Al_2O_3$ contained in the acidic aqueous alumina sol of interest is different, the correlation between the concentration of $Al_2O_3$ and electric conductivity may be calculated as being proportional to the correlation between 10 wt % of $Al_2O_3$ and electric conductivity. The desalting temperature is generally 10 to 60° C. and may be normal temperature.

In the step (C), nitric acid, hydrochloric acid, sulfuric acid, perchloric acid, acetic acid, formic acid and lactic acid can be used as the acid.

In the step (C), both batch system and continuous system may be used for the diafiltration process. An apparatus for the diafiltration process is preferably of a cross-flow type.

An ultrafiltration membrane having a cut-off molecular weight of 6,000 to 200,000 which can be obtained as a commercially available industrial product may be used as the ultrafiltration membrane. A dynamic membrane (ultrafiltration membrane) having a gel layer of colloidal particles formed on a microfiltration membrane which is used in a cross-flow filtration process may also be used.

Concentration can be carried out by a diafiltration process and/or ultrafiltration process until the concentration of $Al_2O_3$ of interest becomes maximal at 20 wt %.

The description is made of a process according to a second aspect of the present invention. This process is a variation of the process according to the first aspect of the present invention.

The same operations as in the steps (A) and (B) are used in the steps (a) and (b) of the process according to the second aspect of the present invention. However, an operation different from that of the step (C) is used in the step (c).

In the step (c), the aqueous suspension obtained in the step (b) is contacted to a hydrogen-type acid cation-exchange resin and a hydroxyl-type strong-base anion-exchange resin.

In the step (c), the alkali added in the step (a) is removed by the above contact treatment with the hydrogen-type acid cation-exchange resin. The content of an acid which is a stabilizer for the acidic aqueous alumina sol is adjusted by the contact treatment with the hydroxyl-type strong-base anion-exchange resin.

The hydrogen-type acid cation-exchange resin is prepared by subjecting a commercially available strong-acid cation-exchange resin and/or weak-acid cation-exchange resin to an ion exchange treatment with an acid and rinsing. The hydrogen-type acid cation-exchange resin is preferably used in an amount of about 3 equivalents and not 1 equivalent of the alkali added in the step (a) which is to be removed. The contact treatment with the resin is carried out as follows. (1) A solution to be treated is caused to flow through a column filled with the resin either downward or upward. (2) The resin is added to a solution to be treated, stirred and then filtrated. The temperature of the contacted solution is generally 10 to 60° C. and may be normal temperature.

The hydroxyl-type strong-base anion-exchange resin is prepared by subjecting a commercially available strong-base anion-exchange resin to an ion exchange treatment with an aqueous solution of sodium hydroxide and rinsing. The resin is used in such an amount that an excessive acid contained in the acidic aqueous alumina sol from which the alkali has been removed should be removed and that an acidic aqueous alumina sol having a pH of 3 to 6 should be obtained. The contact treatment with the resin is carried out simply by adding the resin to a solution to be treated, stirring and then separating the resin by filtration. The temperature of the contacted solution is generally 10 to 60° C. and may be normal temperature.

The resulting acidic aqueous alumina sol having a pH of 3 to 6 can be concentrated by a known method such as vacuum concentration or ultrafiltration until the concentration of $Al_2O_3$ of interest becomes maximal at 20 wt %, whereby a stable acidic aqueous alumina sol is obtained.

The description is made of a process according to a third aspect of the present invention. This process is a variation of the process according to the first aspect of the present invention as well.

The same operation as in the above step (A) is used in the step (A') of the process of the third aspect of the invention. The step (B') is the step of desalting the reaction mixture obtained in the step (A'). In the subsequent step (C'), the same operation as in the above step (B) is conducted, and in the step (D') a different operation from that of the above step (C) is carried out.

In the step (B'), the reaction mixture obtained in the step (A') is treated by cake filtration. For this treatment, a cross-flow filtration process is preferably employed in the cake filtration.

In the step (B'), a salt generated by the alkali added in the step (A') is removed by adding water. To maintain a pH at 9 to 12, an alkali may be added to the desalted reaction mixture as required.

When separation and purification are carried out by removing the alkali to the side of a solution passing through a cake filtration membrane using cake filtration, a salt always remains in the reaction mixture in a batch process. Then, in the cross-flow filtration process, water and an alkali are added to the reaction mixture to increase the amount of a solution passing through the cake filtration member while forming a desalted mixture having a pH of 9 to 12, whereby the removal rate of the salt is increased to proceed with desalting efficiently.

The desalting is carried out until electric conductivity becomes 500 $\mu$S/cm or less, preferably 300 to 100 $\mu$S/cm based on 4 wt % of $Al_2O_3$ contained in the desalted mixture. When the concentration of $Al_2O_3$ of interest contained in the desalted mixture is different, the correlation between the concentration of $Al_2O_3$ and electric conductivity may be calculated as being proportional to the correlation between 4 wt % of $Al_2O_3$ and electric conductivity. The desalting temperature is generally 10 to 60° C. and may be normal temperature.

Illustrative examples of the alkali which may be added as required in the step (B') include alkali metal hydroxides, alkali earth metal hydroxides, alkali metal aluminates, alkali earth metal aluminates, ammonium hydroxide, quaternary ammonium hydroxide, guanidine hydroxide, amines and the like. Out of these, alkali metal hydroxides such as sodium hydroxide, potassium hydroxide and cesium hydroxide are preferred and sodium hydroxide is particularly preferred. An alkali produced from an insoluble salt in the desalted reaction mixture as a by-product is naturally removed.

In the step (B'), both a batch system and continuous system can be employed for the cross-flow filtration process. A preferred industrial apparatus for the process is a continuous rotary filter press which was developed by the National Organic Synthesis Research Laboratory of Czechoslovakia (for details, refer to K. Michel and V. Gruber, Chemie-Ingenieur-Technik Vol. 43, pp. 380 (1971) and F. M. Tiller, Filtration & Separation Vol. 15, pp. 204 (1978)).

A known filter cloth can be used in cake filtration. A microfiltration membrane is preferred as the cloth. A microfiltration membrane having a nominal pore size of 0.05 to 10 $\mu$m obtained as a commercially available industrial product can be used as the microfiltration membrane.

In the step (C'), the same operation as in the above step (B) is carried out. In this step (C'), the reaction mixture obtained in the step (B') is subjected to a hydrothermal treatment after the completion of the step (B'), preferably immediately after the completion of the step (B'). If the reaction mixture obtained in the step (B') is left for a long time, it is separated into a gel and an aqueous solution disadvantageously. By this hydrothermal treatment, an aqueous suspension containing an alumina hydrate having a boehmite structure is obtained as in the step (B) of the process according to the first aspect of the invention.

In the step (D'), peptization is carried out by adding an acid. While addition of water and an acid is essential in the step (C), in the process of the third aspect of the invention, an acidic aqueous alumina sol can be obtained by adding only an acid as excessive acids have already been removed in the step (B'). The concentration of an electrolyte contained in the acidic aqueous alumina sol can be adjusted by desalting by ultrafiltration in the process of the first aspect of the invention or a treatment with an ion-exchange resin in the process of the second aspect of the invention, as required.

In the step (D'), nitric acid, hydrochloric acid, sulfuric acid, perchloric acid, acetic acid, formic acid or lactic acid can be used as the acid.

When the particle size distribution of the acidic aqueous alumina sol having a pH of 3 to 6 obtained in the steps (C), (c) and (D') is measured by a dynamic light scattering method, there are a case where particles having a hydrodynamic diameter of 50 to 400 nm are observed and another case where both particles having a hydrodynamic diameter of 50 to 400 nm and particles having a hydrodynamic diameter of 600 to 1,400 nm are observed. The proportion of high structural aggregates of secondary particles which are particles having a hydrodynamic diameter of 600 to 1,400 nm is small in this acidic aqueous alumina sol.

Therefore, it is considered that the high structural aggregates of secondary particles are peptized into secondary particles (colloidal particles) by the addition of an acid and desalting in the steps (C) and (c) and the addition of an acid in the step (D').

The process according to a fourth aspect of the present invention is a process for producing a high-concentration and stable acidic aqueous alumina sol, characterized in that the stable acidic aqueous alumina sol obtained by the above-described process according to the first, second, or third aspect of the present invention is mechanically dispersed and concentrated.

In this process, by mechanically dispersing the stable acidic aqueous alumina sol obtained by the above-described process according to the first, second, or third aspect of the present invention, the high structural aggregates of secondary particles which are present in the acidic aqueous alumina sol in a trace amount are crushed, the formed edge-to-edge bonds of the secondary particles are cut with the result of a reduction in the lengths thereof in an elongation direction, and the dispersibility of the sol is further improved, thereby making it possible to obtain a high-concentration and stable acidic aqueous alumina sol.

The mechanical dispersion refers to a media mill treatment, colloid mill treatment, high-speed high-shear stirring and high-impact dispersion. Apparatuses used for the media mill treatment include a ball mill, attritor, sand mill, bead mill and the like. Apparatuses used for colloid mill treatment include a colloid mill, stone mill, K.D. mill, homogenizer and the like. Apparatuses used for high-speed high-shear stirring include High Speed Disperser, High Speed Impeller, Disolver and the like as product names. Apparatuses used for high-impact dispersion include a high-pressure impact homogenizer using a high-pressure pump and ultrasonic high-pressure impact homogenizer. The temperature of the mechanically dispersed solution is generally 10 to 60° C. and may be normal temperature.

The acidic aqueous alumina sol which has been mechanically dispersed can be concentrated by a known method such as vacuum concentration or ultrafiltration until the concentration of $Al_2O_3$ of interest becomes maximal at 30 wt %. Thereby, a high-concentration and stable acidic aqueous alumina sol can be obtained.

When the particle size distribution of this high-concentration and stable acidic aqueous alumina sol is measured by a dynamic light scattering method, there are a case where particles having a hydrodynamic diameter of 50 to 400 nm are observed and another case where both particles having a hydrodynamic diameter of 10 to 30 nm and particles having a hydrodynamic diameter of 50 to 400 nm are observed. Through comparison with the results of observation through a transmission electron microscope, it is judged that the particles having a hydrodynamic diameter of 10 to 30 nm are rectangular plate-like primary particles having a length of one side of 10 to 30 nm and the particles having a hydrodynamic diameter of 50 to 400 nm are 50 to 300 nm of elongate secondary particles (colloidal particles) which are elongated in only one plane and formed by edge-to-edge coagulation of rectangular plate-like primary particles (colloidal particles) having a length of one side of 10 to 30 nm.

In the steps (A), (a) and (A'), an acidic aqueous alumina sol containing an alumina hydrate having a boehmite structure of interest cannot be obtained from the reaction mixture having a pH of less than 9 which has been obtained by adding an alkali even when a hydrothermal treatment is carried out in the subsequent step. On the other hand, an aqueous alumina suspension containing an alumina hydrate having a boehmite structure of interest can be obtained from the reaction mixture having a pH of more than 12 which has been obtained by adding an excessive amount of alkali. However, in the alkali removal treatment of steps (C), (c) and (B'), the excessive alkali must also be removed disadvantageously. Therefore, the reaction mixture obtained by adding an alkali preferably has a pH of 9 to 11.

In the steps (B), (b) and (C'), when the reaction mixture is subjected to a hydrothermal treatment at a temperature of less than 110° C., it takes long to generate a crystal structure for the rectangular plate-like primary particle of an alumina hydrate having a boehmite structure from the fibrous colloidal particle of an amorphous alumina hydrate in the aqueous suspension disadvantageously. Meanwhile, for a hydrothermal treatment at more than 250° C., a quenching apparatus and ultra high pressure container are required disadvantageously.

In the steps (C), (c) and (D'), the aqueous suspension containing an alumina hydrate having a boehmite structure is converted into a stable aqueous alumina sol by adding an acid and/or by removing an electrolyte derived from the alkali contained in the suspension.

The pH of the sol is adjusted to 3 to 6, preferably 3.5 to 5.5 by adding the acid as a stabilizer to improve the stability of the sol. Therefore, a stable acidic aqueous alumina sol having any $Al_2O_3$ concentration of up to 20 wt % can be obtained. This sol is stable without being gelated even when it is kept airtight at 50° C. for one month.

The high-concentration and stable acidic aqueous alumina sol obtained by the process according to the fourth aspect of the present invention is a high-concentration and stable acidic aqueous alumina sol having any $Al_2O_3$ concentration of up to 30 wt %. This sol is stable without being gelated even when it is kept airtight at 50° C. for one month.

The colloidal particles of an alumina hydrate obtained in the present invention has an $H_2O/Al_2O_3$ molar ratio of 1.0 to 1.2 after it is dried at 110° C. according to differential thermal analysis at a temperature of up to 1100° C. and is identified as colloidal particles of an alumina hydrate having a boehmite structure according to the result of powder X-ray diffraction.

When the stable acidic aqueous alumina sol and the high-concentration and stable acidic aqueous alumina sol obtained in the present invention are observed through a transmission electron microscope, the colloidal particles are 50 to 300 nm of elongate (ribbon-shaped) secondary particles which are elongated in only one plane and formed by edge-to-edge coagulation of rectangular primary particles having a length of one side of 10 to 30 nm. The thicknesses of the primary particle and the secondary particle range from 2.5 to 7.5 nm.

Analysis methods used in the present invention are as follows.
(1) analysis of composition
   (i) $Al_2O_3$ concentration: gravimetric analysis (residue after baking at 500° C.)
   (ii) $Na_2O$ concentration: atomic absorption spectrometry (the pretreatment is a dissolution treatment with hydrochloric acid)
   (iii) acetic acid concentration: neutralization titration method
(2) pH measurement
   The M-8AD pH meter (of Horiba, Ltd.) was used.
(3) electric conductivity
   The CM-30S electric conductivity meter (of TOA Electronics Ltd.) was used.
(4) particle size measured by a dynamic light scattering method
   The Coulter N4 (registered trademark) (of Coulter Electronics, Ltd.) was used as a particle size meter using a dynamic light scattering method. A cumulants method was used to measure the hydrodynamic diameter of particles contained in the solution.
(measurement condition) solvent: purified water (25° C.)
(5) particle size distribution measured by a dynamic light scattering method
   The Coulter N4 (registered trademark) (of Coulter Electronics, Ltd.) was used as a particle size meter using a dynamic light scattering method. An S.D.P. method (multimodal analysis program) was used to measure a hydrodynamic particle size distribution in the solution. The hydrodynamic diameter of each particle group (mode) is obtained as a measurement result.
(measurement condition) solvent: purified water (25° C.)
(6) specific surface area (BET method)
   A sample which has been dried under predetermined conditions is measured using the MONOSOKB MS-16 specific surface area meter which makes use of a nitrogen gas adsorption method (of Quantachrome Corp.).
(7) observation through a transmission electron microscope
   A sample which has been diluted with purified water is applied to a hydrophilic carbon-coated collodion film on a microscope sample grid of copper and dried to prepare a sample tobeobserved. Thesampleisphotomicrographedusingthe H-500 transmission electron microscope (of Hitachi, Ltd.) for observation.
(8) differential thermal analysis
   The TG/DTA320U differential thermal analyzer (of Seiko Instruments & Electronics, Ltd.) was used.
   (measurement conditions)
      sample: 16 mg, reference: 16 mg of $\alpha$-alumina, measurement temperature range: 25 to 1,100° C., temperature elevation rate: 10° C./min
(9) powder X-ray diffraction
   The JEOL JDX-8200T X-ray diffraction apparatus (of JEOL Ltd.) was used.

EXAMPLES

Example 1

1,926.7 g of water was added to 481.7 g of a commercially available aqueous alumina sol containing fibrous colloidal particles of an amorphous alumina hydrate (Aluminasol-200 (trademark) of Nissan Chemical Industries, Ltd., $Al_2O_3$ concentration of 10.2 wt %, acetic acid concentration of 2.7 wt %) and strongly stirred, and 184 g of an aqueous solution of sodium hydroxide containing 5 wt % of NaOH was added to the resulting mixture in about 10 minutes and further stirred for 30 minutes. Thus, a reaction mixture (pH of 9.27, $Al_2O_3$ concentration of 1.90 wt %) was obtained.

2,300 g of this reaction mixture was charged into a porcelain enameled stainless steel autoclave and subjected to a hydrothermal treatment at 140° C. for 12 hours. The thus obtained aqueous suspension had a pH of 6.68, an electric conductivity of 6,340 $\mu$S/cm and an $Al_2O_3$ concentration of 1.90 wt %. When the particle size distribution of this aqueous suspension was measured by a dynamic light scattering method, particles having a hydrodynamic diameter of 178 nm (standard deviation of 21 nm) and particles having a hydrodynamic diameter of 950 nm (standard deviation of 120 nm) were observed.

After the aqueous suspension was taken out, 5,400 g of purified water and 6.0 g of acetic acid were added to the total amount of the aqueous suspension and stirred to adjust pH to 5.12. Thereafter, the resulting mixture was desalted and concentrated by an automatic continuous pressure filtration apparatus equipped with a stirrer and an ultrafiltration membrane (cut-off molecular weight of 50,000) to obtain 350 g of an acidic aqueous alumina sol.

The obtained acidic aqueous alumina sol had a pH of 4.70, an $Al_2O_3$ concentration of 12.5 wt %, an $Na_2O$ concentration of 287 ppm per weight, an electric conductivity of 803 $\mu$S/cm, a viscosity of 180 mPa·s, an acetic acid concentration of 0.22 wt %, a particle size measured by a dynamic light scattering method of 247 nm, a specific surface area measured by the BET method of powders dried at 110° C. of 142 $m^2/g$ and a specific surface area measured by the BET method of powders dried at 300° C. of 145 $m^2/g$.

When the particle size distribution of the obtained acidic aqueous alumina sol was measured by a dynamic light scattering method, only particles having a hydrodynamic diameter of 240 nm (standard deviation of 57 nm) were observed. It was observed through a transmission electron microscope that the colloidal particles of an alumina hydrate contained in the obtained acidic aqueous alumina sol were 50 to 300 nm elongate (ribbon-shaped) secondary particles which were elongated in only one plane and formed by edge-to-edge coagulation of rectangular plate-like primary particles having a length of one side of 10 to 20 nm. The thicknesses of the primary particle and the secondary particle ranged from 2.5 to 7.5 nm.

When powders obtained by drying the acidic aqueous alumina sol at 110° C. was thermally analyzed at 1,100° C., the colloidal particles of the alumina hydrate had an $H_2O/Al_2O_3$ molar ratio of 1.13 and were identified as an alumina hydrate having a boehmite structure according to the result of powder X-ray diffraction of powders obtained by drying the colloidal particles at 110° C. (Table 1). This acidic aqueous alumina sol was stable without being gelated after it was kept airtight at 50° C. for one month.

TABLE 1

| d (angstrom) | $I/I_0$ (relative strength) |
|---|---|
| 6.197 | 100 |
| 3.166 | 72 |
| 2.356 | 63 |
| 1.986 | 9 |
| 1.862 | 59 |
| 1.772 | 11 |
| 1.668 | 15 |
| 1.528 | 7 |
| 1.458 | 15 |

TABLE 1-continued

| d (angstrom) | $I/I_0$ (relative strength) |
|---|---|
| 1.435 | 20 |
| 1.390 | 10 |
| 1.316 | 16 |

Example 2

1,767.0 g of water was added to 450.0 g of a commercially available aqueous alumina sol containing fibrous colloidal particles of an amorphous alumina hydrate (Aluminasol-200 (trademark) of Nissan Chemical Industries, Ltd., $Al_2O_3$ concentration of 10.7 wt %, acetic acid concentration of 3.16 wt %) and strongly stirred, and 211.5 g of an aqueous solution of sodium hydroxide containing 4.9 wt % of NaOH was added to the resulting mixture in about 10 minutes and further stirred for 3 hours. Thus, a reaction mixture (pH of 10.05, $Al_2O_3$ concentration of 1.98 wt %) was obtained.

2,300 g of this reaction mixture was charged into a porcelain enameled stainless steel autoclave and subjected to a hydrothermal treatment at 140° C. for 18 hours. The thus obtained aqueous suspension had a pH of 8.38, an electric conductivity of 7,955 $\mu$S/cm and an $Al_2O_3$ concentration of 1.98 wt %.

After this aqueous suspension was taken out, 4,467 g of purified water and 10.5 g of acetic acid were added to the total amount of the aqueous suspension and stirred to adjust pH to 4.89. Thereafter, the resulting mixture was desalted and concentrated by an automatic continuous pressure filtration apparatus equipped with a stirrer and an ultrafiltration membrane (cut-off molecular weight of 50,000) to obtain 364 g of an acidic aqueous alumina sol.

The obtained acidic aqueous alumina sol had a pH of 4.34, an $Al_2O_3$ concentration of 12.0 wt %, an $Na_2O$ concentration of 292 ppm per weight, an electric conductivity of 290 $\mu$S/cm, a viscosity of 168 mPa·s, an acetic acid concentration of 0.26 wt %, a particle size measured by a dynamic light scattering method of 264 nm, a specific surface area measured by the BET method of powders dried at 110° C. of 135 $m^2/g$ and a specific surface area measured by the BET method of powders dried at 300° C. of 136 $m^2/g$. It was observed through a transmission electron microscope that the colloidal particles of an alumina hydrate contained in the obtained acidic aqueous alumina sol were 50 to 300 nm elongate (ribbon-shaped) secondary particles which were elongated in only one plane and formed by edge-to-edge coagulation of rectangular plate-like primary particles having a length of one side of 10 to 20 nm. This acidic aqueous alumina sol was stable without being gelated after it was kept airtight at 50° C. for one month.

Example 3

A reaction mixture was prepared in the same manner as in Example 2 and 2,428.5 g of the reaction mixture was obtained (pH of 10.05, $Al_2O_3$ concentration of 1.98 wt %).

2,300 g of this reaction mixture was charged into a porcelain enameled stainless steel autoclave and subjected to a hydrothermal treatment at 140° C. for 12 hours. The thus obtained aqueous suspension had a pH of 7.59, an electric conductivity of 7,955 $\mu$S/cm and an $Al_2O_3$ concentration of 1.98 wt %.

After this aqueous suspension was taken out, the total amount of the aqueous suspension was caused to pass through a column filled with 300 ml of a hydrogen-type cation-exchange resin (Amberlite IR-120B (registered trademark) of Rohm and Haas Company), 190 g of a hydroxyl-type strong-base anion-exchange resin (Amberlite IRA-410 (registered trademark) of Rohm and Haas Company) was then injected into the above treated product to adjust its pH to 4.03, and the resulting mixture was vacuum concentrated to obtain 320 g of an acidic aqueous alumina sol.

The obtained acidic aqueous alumina sol had a pH of 4.11, an $Al_2O_3$ concentration of 13.5 wt %, an $Na_2O$ concentration of 310 ppm per weight, an electric conductivity of 402 $\mu$S/cm, a particle size measured by a dynamic light scattering method of 670 nm, a specific surface area measured by the BET method of powders dried at 110° C. of 160 m²/g and a specific surface area measured by the BET method of powders dried at 300° C. of 165 m²/g. It was observed through a transmission electron microscope that the colloidal particles of an alumina hydrate contained in the obtained acidic aqueous alumina sol were 50 to 300 nm elongate (ribbon-shaped) secondary particles which were elongated in only one plane and formed by edge-to-edge coagulation of rectangular plate-like primary particles having a length of one side of 10 to 20 nm. This acidic aqueous alumina sol was stable without being gelated after it was kept airtight at 50° C. for one month.

Example 4

1,800 g of water was added to 500.0 g of a commercially available aqueous alumina sol containing fibrous colloidal particles of an amorphous alumina hydrate (Aluminasol-200 (trademark) of Nissan Chemical Industries, Ltd., $Al_2O_3$ concentration of 10.2 wt %, acetic acid concentration of 2.7 wt %) and strongly stirred, and 203 g of an aqueous solution of sodium hydroxide containing 5 wt % of NaOH was added to the resulting mixture in about 10 minutes and further stirred for 30 minutes. Thus, a reaction mixture (pH of 10.02, $Al_2O_3$ concentration of 2.04 wt %) was obtained.

2,300 g of this reaction mixture was charged into a porcelain enameled stainless steel autoclave and subjected to a hydrothermal treatment at 140° C. for 18 hours. The thus obtained aqueous suspension had a pH of 7.88, an electric conductivity of 7,105 $\mu$S/cm and an $Al_2O_3$ concentration of 2.05 wt %.

After this aqueous suspension was taken out, the total amount of the aqueous suspension was caused to pass through a column filled with 300 ml of a hydrogen-type cation-exchange resin (Amberlite IR-120B (registered trademark) of Rohm and Haas Company), 190 g of a hydroxyl-type strong-base anion-exchange resin (Amberlite IRA-410 (registered trademark) of Rohm and Haas Company) was then injected into the above treated product to adjust its pH to 4.33, and the resulting mixture was vacuum concentrated to obtain 311 g of an acidic aqueous alumina sol.

The obtained acidic aqueous alumina sol had a pH of 4.09, an $Al_2O_3$ concentration of 14.5 wt %, an $Na_2O$ concentration of 301 ppm per weight, an electric conductivity of 464 $\mu$S/cm, a viscosity of 320 mPa·s, an acetic acid concentration of 0.29 wt %, a particle size measured by a dynamic light scattering method of 374 nm, a specific surface area measured by the BET method of powders dried at 110° C. of 138 m²/g and a specific surface area measured by the BET method of powders dried at 300° C. of 139 m²/g. It was observed through a transmission electron microscope that the colloidal particles of an alumina hydrate contained in the obtained acidic aqueous alumina sol were 50 to 300 nm of elongate (ribbon-shaped) secondary particles which were elongated in only one plane and formed by edge-to-edge coagulation of rectangular plate-like primary particles having a length of one side of 10 to 20 nm. This acidic aqueous alumina sol was stable without being gelated after it was kept airtight at 50° C. for one month.

Example 5

A reaction mixture was prepared in the same manner as in Example 4 and 2,503 g of the reaction mixture (pH of 10.05, $Al_2O_3$ concentration of 2.04 wt %) was obtained. 2,300 g of this reaction mixture was charged into a porcelain enameled stainless steel autoclave and subjected to a hydrothermal treatment at 140° C. for 24 hours. The thus obtained aqueous suspension had a pH of 7.98, an electric conductivity of 7,330 $\mu$S/cm and an $Al_2O_3$ concentration of 2.04 wt %.

After this aqueous suspension was taken out, the total amount of the aqueous suspension was caused to pass through a column filled with 300 ml of a hydrogen-type cation-exchange resin (Amberlite IR-120B (registered trademark) of Rohm and Haas Company), 180 g of a hydroxyl-type strong-base anion-exchange resin (Amberlite IRA-410 (registered trademark) of Rohm and Haas Company) was then injected into the above treated product to adjust its pH to 4.10, and the resulting mixture was vacuum concentrated to obtain 343 g of an acidic aqueous alumina sol.

The obtained acidic aqueous alumina sol had a pH of 4.01, an $Al_2O_3$ concentration of 13.0 wt %, an electric conductivity of 501 $\mu$S/cm, a particle size measured by a dynamic light scattering method of 380 nm, a specific surface area measured by the BET method of powders dried at 110° C. of 133 m²/g and a specific surface area measured by the BET method of powders dried at 300° C. of 135 m²/g. It was observed through a transmission electron microscope that the colloidal particles of an alumina hydrate contained in the obtained acidic aqueous alumina sol were 50 to 300 nm of elongate (ribbon-shaped) secondary particles which were elongated in only one plane and formed by edge-to-edge coagulation of rectangular plate-like primary particles having a length of one side of 10 to 20 nm. This acidic aqueous alumina sol was stable without being gelated after it was kept airtight at 50° C. for one month.

Example 6

800 g of the acidic aqueous alumina sol obtained in Example 4 (pH of 4.09, $Al_2O_3$ concentration of 14.5 wt %) was mechanically dispersed at 10,000 rpm for 2 hours using a colloid mill (the AS-3 homogenizer (trademark) of Nihon-seiki Kaisha Ltd.) and then vacuum concentrated to obtain 574 g of a high-concentration acidic aqueous alumina sol.

The obtained acidic aqueous alumina sol had a pH of 4.21, an $Al_2O_3$ concentration of 20.2 wt %, a particle size measured by a dynamic light scattering method of 189 nm, a specific surface area measured by the BET method of powders dried at 110° C. of 136 m²/g, and a specific surface area measured by the BET method of powders dried at 300° C. of 137 m²/g. When the particle size distribution of the obtained acidic aqueous alumina sol was measured by a dynamic light scattering method, only particles having a hydrodynamic diameter of 181 nm (standard deviation of 22 nm) were observed. It was observed through a transmission electron microscope that the colloidal particles of an alumina hydrate contained in the obtained acidic aqueous alumina sol were 50 to 300 nm of elongate (ribbon-shaped)

secondary particles which were elongated in only one plane and formed by edge-to-edge coagulation of rectangular plate-like primary particles having a length of one side of 10 to 20 nm. This sol was stable without being gelated after it was kept airtight at 50° C. for one month.

Example 7

400 g of the acidic aqueous alumina sol obtained in Example 4 was mechanically dispersed at 1,500 rpm for 1 hour using a sand mill having 350 g of 1 to 1.5 mm diameter glass beads as a medium (the 1AG6H sand grinder (trademark) of Aimex Co., Ltd.) and then vacuum concentrated to obtain 260 g of a high-concentration acidic aqueous alumina sol.

The obtained acidic aqueous alumina sol had a pH of 4.19, an $Al_2O_3$ concentration of 20.1 wt %, a particle size measured by a dynamic light scattering method of 211 nm, a specific surface area measured by the BET method of powders dried at 110° C. of 136 $m^2/g$ and a specific surface area measured by the BET method of powders dried at 300° C. of 137 $m^2/g$. It was observed through a transmission electron microscope that the colloidal particles of an alumina hydrate contained in the obtained acidic aqueous alumina sol were 50 to 300 nm of elongate (ribbon-shaped) secondary particles which were elongated in only one plane and formed by edge-to-edge coagulation of rectangular plate-like primary particles having a length of one side of 10 to 20 nm. This sol was stable without being gelated after it was kept airtight at 50° C. for one month.

Example 8

4,000 g of the acidic aqueous alumina sol obtained in Example 2 was mechanically dispersed three times at a flow rate of 400 ml/min using multiple ultrasonic high-pressure impact homogenizers (the MUS600T-3 ultrasonic homogenizers (trademark) of Nihonseiki Kaisha Ltd.) and then vacuum concentrated to obtain 1,890 g of a high-concentration acidic aqueous alumina sol.

The obtained acidic aqueous alumina sol had a pH of 4.52, an $Al_2O_3$ concentration of 25.3 wt %, an electric conductivity of 491 $\mu S/cm$, a viscosity of 1,093 mPa·s, a particle size measured by a dynamic light scattering method of 139 nm, a specific surface area measured by the BET method of powders dried at 110° C. of 139 $m^2/g$, and a specific surface area measured by the BET method of powders dried at 300° C. of 141 $m^2/g$. When the particle size distribution of the obtained acidic aqueous alumina sol was measured by a dynamic light scattering method, both particles having a hydrodynamic diameter of 17.1 nm (standard deviation of 4 nm) and particles having a hydrodynamic diameter of 134 nm (standard deviation of 34 nm) were observed. It was observed through a transmission electron microscope that the colloidal particles of an alumina hydrate contained in the obtained acidic aqueous alumina sol consisted of 50 to 300 nm elongate (ribbon-shaped) secondary particles which were elongated in only one plane and formed by edge-to-edge coagulation of rectangular plate-like primary particles having a length of one side of 10 to 20 nm, and the primary particles. This sol was stable without being gelated after it was kept airtight at 50° C. for one month.

Example 9

2,830 g of water was added to 500.0 g of a commercially available aqueous alumina sol containing fibrous colloidal particles of an amorphous alumina hydrate (Aluminasol-200 (trademark) of Nissan Chemical Industries, Ltd., $Al_2O_3$ concentration of 10.2 wt %, acetic acid concentration of 2.7 wt %) and 445 g of an aqueous solution of basic aluminum acetate ($Al_2O_3$ concentration of 5.73 wt %, acetic acid concentration of 3.0 wt %) prepared by diluting a basic aluminum chloride solution and ion exchanging using an acetic acid-type strong-base anion-exchange resin, and strongly stirred, and 380 g of an aqueous solution of sodium hydroxide containing 5 wt % of NaOH was added to the resulting mixture in about 10 minutes and stirred for 30 minutes. Thus, a reaction mixture (pH of 9.96, $Al_2O_3$ concentration of 1.84 wt %) was obtained.

2,300 g of this reaction mixture was charged into a porcelain enameled stainless steel autoclave and subjected to a hydrothermal treatment at 140° C. for 18 hours. The obtained aqueous suspension had a pH of 8.03, an electric conductivity of 8,150 $\mu S/cm$ and an $Al_2O_3$ concentration of 1.84 wt %.

After this aqueous suspension was taken out, the total amount of the aqueous suspension was caused to pass through a column filled with 300 ml of a hydrogen-type cation-exchange resin (Amberlite IR-120B (registered trademark) of Rohm and Haas Company), 220 g of a hydroxyl-type strong-base anion-exchange resin (Amberlite IRA-410 (registered trademark) of Rohm and Haas Company) was then injected into the above treated product to adjust its pH to 4.10, and the resulting mixture was vacuum concentrated to obtain 289 g of an acidic aqueous alumina sol.

The obtained acidic aqueous alumina sol had a pH of 4.22, an $Al_2O_3$ concentration of 14.0 wt %, an electric conductivity of 411 $\mu S/cm$, a particle size measured by a dynamic light scattering method of 390 nm, a specific surface area measured by the BET method of powders dried at 110° C. of 115 $m^2/g$ and a specific surface area measured by the BET method of powders dried at 300° C. of 117 $m^2/g$. It was observed through a transmission electron microscope that the colloidal particles of an alumina hydrate contained in the obtained acidic aqueous alumina sol were 50 to 300 nm of elongate (ribbon-shaped) secondary particles which were elongafed in only one plane and formed by edge-to-edge coagulation of rectangular plate-like primary particles having a length of one side of 15 to 25 nm. This sol was stable without being gelated after it was kept airtight at 50° C. for one month.

Example 10

2,895 g of water was added to 800 g of a commercially available aqueous alumina sol containing fibrous colloidal particles of an amorphous alumina hydrate (Aluminasol-200 (trademark) of Nissan Chemical Industries, Ltd., $Al_2O_3$ concentration of 10.2 wt %, acetic acid concentration of 2.7 wt %) and strongly stirred, and 305 g of an aqueous solution of sodium hydroxide containing 5 wt % of NaOH was added to the resulting mixture in about 10 minutes and further stirred for 30 minutes. Thus, a reaction mixture (pH of 9.55, $Al_2O_3$ concentration of 2.04 wt %) was obtained.

2,300 g of this reaction mixture was charged into a porcelain enameled stainless steel autoclave and subjected to a hydrothermal treatment at 120° C. for 18 hours. The thus obtained aqueous suspension had a pH of 7.50, an electric conductivity of 6,790 $\mu S/cm$ and an $Al_2O_3$ concentration of 2.04 wt %.

After this aqueous suspension was taken out, 7,123 g of purified water and 4.0 g of acetic acid were added to the total amount of the aqueous suspension and stirred to adjust pH to 3.88. Thereafter, the resulting mixture was desalted and concentrated by an automatic continuous pressure filtration apparatus equipped with a stirrer and an ultrafiltration membrane (cut-off molecular weight of 50,000) to obtain 360 g of an acidic aqueous alumina sol.

The obtained acidic aqueous alumina sol had a pH of 4.10, an $Al_2O_3$ concentration of 12.5 wt %, an electric conductivity of 360 $\mu$S/cm, a particle size measured by a dynamic light scattering method of 319 nm, a specific surface area measured by the BET method of powders dried at 110° C. of 173 m$^2$/g and a specific surface area measured by the BET method of powders dried at 300° C. of 270 m$^2$/g. It was observed through a transmission-type electron microscope that the colloidal particles of an alumina hydrate contained in the obtained acidic aqueous alumina sol were 50 to 300 nm of elongate (ribbon-shaped) secondary particles which were elongated in only one plane and formed by edge-to-edge coagulation of rectangular plate-like primary particles having a length of one side of 10 to 20 nm. This sol was stable without being gelated after it was kept airtight at 50° C. for one month.

Example 11

A reaction mixture was prepared in the same manner as in Example 10 and 4,000 g of the reaction mixture (pH of 9.55, $Al_2O_3$ concentration of 2.04 wt %) was obtained.

2,300 g of this reaction mixture was charged into a porcelain enameled stainless steel autoclave and subjected to a hydrothermal treatment at 160° C. for 18 hours. The thus obtained aqueous suspension had a pH of 7.20, an electric conductivity of 6,900 $\mu$S/cm and an $Al_2O_3$ concentration of 2.04 wt %.

After this aqueous suspension was taken out, 7,450 g of purified water and 3.80 g of acetic acid were added to the total amount of the aqueous suspension and stirred to adjust pH to 3.92. Thereafter, the resulting mixture was desalted and concentrated by an automatic continuous pressure filtration apparatus equipped with a stirrer and an ultrafiltration membrane (cut-off molecular weight of 50,000) to obtain 281 g of an acidic aqueous alumina sol.

The obtained acidic aqueous alumina sol had a pH of 4.30, an $Al_2O_3$ concentration of 16.0 wt %, an electric conductivity of 602 $\mu$S/cm, a particle size measured by a dynamic light scattering method of 420 nm, a specific surface area measured by the BET method of powders dried at 110° C. of 88 m$^2$/g and a specific surface area measured by the BET method of powders dried at 300° C. of 95 m$^2$/g. It was observed through a transmission-type electron microscope that the colloidal particles of an alumina hydrate contained in the obtained acidic aqueous alumina sol were 50 to 300 nm of elongate (ribbon-shaped) secondary particles which were elongated in only one plane and formed by edge-to-edge coagulation of rectangular plate-like primary particles having a length of one side of 10 to 20 nm. This sol was stable without being gelated after it was kept airtight at 50° C. for one month.

Example 12

A reaction mixture was prepared in the same manner as in Example 2 and 4,550 g of the reaction mixture (pH of 10.05, electric conductivity of 6,800 $\mu$S/cm, $Al_2O_3$ concentration of 1.98 wt %) was obtained.

This reaction mixture was desalted while water was added at a constant flow rate and circulated using an automatic continuous pressure filtration apparatus equipped with a stirrer and a microfiltration membrane having a nominal pore size of 0.2 $\mu$m. The desalted reaction mixture had a pH of 9.24, an electric conductivity of 18.35 $\mu$S/cm and an $Al_2O_3$ concentration of 3.7 wt %.

4.7 g of an aqueous solution of sodium hydroxide containing 5 wt % of NaOH was added to 2,435 g of this desalted reaction mixture under strong stirring in about 5 minutes and further stirred for 1 hour. Thus, a reaction mixture (pH of 9.94, electric conductivity of 153.6 $\mu$S/cm, $Al_2O_3$ concentration of 3.7 wt %) was obtained.

2,300 g of this desalted reaction mixture was charged into a porcelain enameled stainless steel autoclave and subjected to a hydrothermal treatment at 140° C. for 8 hours. The thus obtained aqueous suspension had a pH of 9.14, an electric conductivity of 239 $\mu$S/cm and an $Al_2O_3$ concentration of 3.7 wt %.

After this aqueous suspension was taken out, 0.7 g of an acetic acid aqueous solution containing 68 wt % of acetic acid was added to the total amount of the aqueous suspension and stirred to adjust pH to 6.90. Thereafter, the resultingmixture was desalted and concentrated using an ultrafiltration membrane (cut-off molecular weight of 50,000) to obtain 925 g of a concentrated aqueous suspension.

1.6 g of an acetic acid aqueous solution containing 68 wt % of acetic acid was added to the obtained concentrated aqueous suspension and stirred to adjust pH to 4.36. The thus obtained acidic aqueous alumina sol had an electric conductivity of 206 $\mu$S/cm, an $Al_2O_3$ concentration of 9.2 wt %, a particle size measured by a dynamic light scattering method of 233 nm, a specific surface area measured by the BET method of powders dried at 110° C. of 150.2 m$^2$/g and a specific surface area measured by the BET method of powders dried at 300° C. of 170.3 m$^2$/g.

The obtained acidic aqueous alumina sol was mechanically dispersed at 10,000 rpm for 2 hours using a colloid mill (the AS-3 homogenizer (trademark) of Nihonseiki Kaisha Ltd.) to obtain 920 g of an acidic aqueous alumina sol.

The obtained acidic aqueous alumina sol had a pH of 4.45, an $Al_2O_3$ concentration of 9.2 wt % and a particle size measured by a dynamic light scattering method of 178 nm. When the particle size distribution of the obtained acidic aqueous alumina sol was measured by a dynamic light scattering method, only particles having a hydrodynamic diameter of 178 nm (standard deviation of 23 nm) were observed. It was observed through a transmission electron microscope that the colloidal particles of an alumina hydrate contained in the obtained acidic aqueous alumina sol were 50 to 300 nm of elongate (ribbon-shaped) secondary particles which were elongated in only one plane and formed by edge-to-edge coagulation of rectangular plate-like primary particles having a length of one side of 10 to 20 nm. This sol was stable without being gelated after it was kept airtight at 50° C. for one month.

Comparative Example 1

1,597.4 g of water was added to 856.5 g of an aqueous solution of basic aluminum acetate ($Al_2O_3$ concentration of 5.73 wt %, acetic acid concentration of 3.0 wt %) prepared by diluting a basic aluminum chloride solution and ion exchanging using an acetic acid-type strong-base anion-exchange resin, and stirred, and 335 g of an aqueous solution of sodium hydroxide containing 5 wt % of NaOH was added to the resulting mixture in about 10 minutes and further stirred for 30 minutes. Thus, a reaction mixture (pH of 9.55, $Al_2O_3$ concentration of 1.76 wt %) was obtained.

2,300 g of this reaction mixture was charged into a porcelain enameled stainless steel autoclave and subjected to a hydrothermal treatment at 140° C. for 12 hours. The thus obtained aqueous suspension had a pH of 6.37, an electric conductivity of 10,000 μS/cm and an $Al_2O_3$ concentration of 1.76 wt %.

After this aqueous suspension was taken out, 4,000 g of purified water and 2 g of acetic acid were added to the total amount of the aqueous suspension and stirred. Thereafter, the resulting mixture was desalted and concentrated by an automatic continuous pressure filtration apparatus equipped with a stirrer and an ultrafiltration membrane (cut-off molecular weight of 50,000) to obtain 259 g of an acidic aqueous alumina sol.

The obtained acidic aqueous alumina sol had a pH of 5.10, an $Al_2O_3$ concentration of 15.0 wt %, a specific surface area measured by the BET method of powders dried at 110° C. of 70 $m^2/g$ and a specific surface area measured by the BET method of powders dried at 300° C. of 80 $m^2/g$. It was observed through a transmission electron microscope that the colloidal particles of an alumina hydrate contained in the obtained acidic aqueous alumina sol were spindle-like particles having a major-axis diameter of 40 to 50 nm which were dispersed independently. When the acidic aqueous alumina sol was left to stand at room temperature for 3 days, the sedimentation of colloidal particles was observed.

Comparative Example 2

2,700 g of water was added to 300 g of a commercially available aqueous alumina sol containing hexagonal plate-like particles and rectangular plate-like particles of an alumina hydrate having a boehmite structure (Aluminasol-520 Of Nissan Chemical Industries, Ltd., $Al_2O_3$ concentration of 20 wt %, nitric acid concentration of 3 wt %, viscosity of 9.8 mPa·s, major-axis diameters of the hexagonal plate-like and rectangular plate-like particles ranging from 20 to 30 nm) and stirred, and 29 g of an aqueous solution of sodium hydroxide containing 5 wt % of NaOH was added to the resulting mixture in about 10 minutes and stirred for 30 minutes. Thus, a reaction mixture (pH of 10.3, $Al_2O_3$ concentration of 1.98 wt %) was obtained.

2,300 g of this reaction mixture was charged into a porcelain enameled stainless steel autoclave and subjected to a hydrothermal treatment at 140° C. for 12 hours. The thus obtained aqueous suspension had a pH of 10.39, an electric conductivity of 1,485 μS/cm and an $Al_2O_3$ concentration of 1.98 wt %.

After this aqueous suspension was taken out, 6,000 g of purified water and 12 g of acetic acid were added to the total amount of the aqueous suspension and stirred to adjust pH to 5.11. Thereafter, the resulting mixture was desalted and concentrated by an automatic continuous pressure filtration apparatus equipped with a stirrer and an ultrafiltration membrane (cut-off molecular weight of 50,000) to obtain 215 g of an acidic aqueous alumina sol.

The obtained acidic aqueous alumina sol had a pH of 4.55. It was observed through a transmission electron microscope that the colloidal particles of an alumina hydrate contained in the obtained acidic aqueous alumina sol were hexagonal plate-like and rectangular plate-like particles having a major-axis diameter of 40 to 50 nm which were dispersed independently.

Comparative Example 3

1,926.7 g of water was added to 481.7 g of a commercially available aqueous alumina sol containing fibrous colloidal particles of an amorphous alumina hydrate (Aluminasol-200 of Nissan Chemical Industries, Ltd., $Al_2O_3$ concentration of 10.2 wt %, acetic acid concentration of 2.7 wt %) and strongly stirred, and 134 g of an aqueous solution of sodium hydroxide containing 5 wt % of NaOH was added to the resulting mixture in about 10 minutes and further stirred for 30 minutes. Thus, a reaction mixture (pH of 8.30, $Al_2O_3$ concentration of 1.93 wt %) was obtained.

2,300 g of this reaction mixture was charged into a porcelain enameled stainless steel autoclave and subjected to a hydrothermal treatment at 140° C. for 12 hours. The thus obtained aqueous suspension had a pH of 6.38, an electric conductivity of 6,190 μS/cm and an $Al_2O_3$ concentration of 1.93 wt %.

After this aqueous suspension was taken out, 5,400 g of purified water and 1.5 g of acetic acid were added to the total amount of the aqueous suspension and stirred to adjust pH to 5.22. Thereafter, the resulting mixture was desalted and concentrated by an automatic continuous pressure filtration apparatus equipped with a stirrer and an ultrafiltration membrane (cut-off molecular weight of 50,000) to obtain 304 g of an acidic aqueous alumina sol.

The obtained acidic aqueous alumina sol had a pH of 4.18, an $Al_2O_3$ concentration of 14.0 wt %, an electric conductivity of 803 μS/cm and a particle size measured by a dynamic light scattering method of 340 nm. It was observed through a transmission electron microscope that the colloidal particles of an alumina hydrate contained in the obtained acidic aqueous alumina sol consisted of fibrous colloidal particles and 50 to 300 nm of elongate (ribbon-shaped) secondary particles which were elongated in only one plane and formed by edge-to-edge coagulation of rectangular plate-like primary particles having a length of one side of 10 to 20 nm. This sol was stable without being gelated after it was kept airtight at 50° C. for one month.

Comparative Example 4

1,926.7 g of water was added to 481.7 g of a commercially available aqueous alumina sol containing fibrous colloidal particles of an amorphous alumina hydrate (Aluminasol-200 of Nissan Chemical Industries, Ltd., $Al_2O_3$ concentration of 10.2 wt %, acetic acid concentration of 2.7 wt %) and strongly stirred, and 184 g of an aqueous solution of sodium hydroxide containing 5 wt % of NaOH was added to the resulting mixture in about 10 minutes and stirred for 30 minutes. Thus, a reaction mixture (pH of 9.27, $Al_2O_3$ concentration of 1.90 wt %) was obtained.

2,300 g of this reaction mixture was charged into a porcelain enameled stainless steel autoclave and subjected to a hydrothermal treatment at 100° C. for 18 hours. The thus obtained aqueous suspension had a pH of 6.58, an electric conductivity of 6,840 μS/cm and an $Al_2O_3$ concentration of 1.90 wt %.

After this aqueous suspension was taken out, the total amount of the aqueous suspension was caused to pass through a column filled with 300 ml of a hydrogen-type cation-exchange resin (Amberlite IR-120B (registered trademark) of Rohm and Haas Company), 289 g of a hydroxyl-type strong-base anion-exchange resin (Amberlite IRA-410 (registered trademark) of Rohm and Haas Company) was injected into the above sol to adjust its pH to 4.10, and the resulting mixture was vacuum concentrated to obtain 397 g of an acidic aqueous alumina sol.

The obtained acidic aqueous alumina sol had a pH of 5.10, an $Al_2O_3$ concentration of 10.5 wt %, an electric conductivity of 3,150 μS/cm and a particle size measured by a dynamic light scattering method of 293 nm. It was observed through a transmission electron microscope that the colloidal particles of an alumina hydrate contained in the obtained acidic aqueous alumina sol were still fibrous particles.

Compared with a conventional aqueous alumina sol, the stable acidic aqueous alumina sol, and the high-concentration and stable acidic aqueous alumina sol obtained by the present invention act like an intermediate between, for example, a commercially available aqueous alumina sol containing hexagonal plate-like and/or rectangular plate-like particles having high dispersibility of an alumina hydrate having a boehmite structure and a commercially available aqueous alumina sol containing fibrous particles having a high thixotropic property of an alumina hydrate having a boehmite structure, and bring about improvements in various applications which have not been attained by the prior art.

Components which are added to a conventional alumina sol to produce a composition may be added to the alumina sol of the present invention. The components include a silica sol, hydrolyte of alkyl silicate, other metal oxide sol, water-soluble resin, resin emulsion, thickener, anti-foaming agent, surfactant, refractory powders, metal powders, pigment, coupling agent and the like.

When the alumina sol of the present invention is blended with various coating components which have been used conventionally, an inorganic coating, heat-resistant coating, corrosion resistant coating, inorganic-organic composite coating or the like can be prepared. A dry coating film formed from a coating containing the alumina sol of the present invention is almost free from pin holes and cracks. The reason for this is considered to be that the 50 to 300 nm elongate (ribbon-shaped) secondary particles contained in the alumina sol do not cause a segregation phenomenon in the coating film which is seen in ordinary colloidal particles and a crosslinked structure is formed by the secondary particles in the coating film.

These coatings, adhesives and the like containing the alumina sol of the present invention can be applied to the surfaces of various base materials such as glass, ceramics, metals, plastics, wood, fibers and paper.

The alumina sol of the present invention can be impregnated into felt products such as ordinary glass fibers, ceramic fibers and other inorganic fibers.

Since the secondary particles of the alumina sol of the present invention have an elongated shape and are as long as 50 to 300 nm, the alumina sol is useful as a surface abrasive for polishing the surface of an interlayer insulating film or a metal wiring of aluminum, copper, tungsten or alloy thereof in a multi-layer wiring semiconductor device and a plating layer such as Ni-P or the like formed on a base material such as a disk for use as a magnetic recording medium.

Although the alumina sol of the present invention exhibits high stability and has the property of changing into a gel in the end by removing its medium, secondary particles contained in the sol have an elongated (ribbon-like) shape and are as long as 50 to 300 nm. When the sol is gelated or after it is cured, it exhibits special properties derived from the sol. It is easily understood that the alumina sol of the present invention is very useful in various applications other than the above.

What is claimed is:

1. A process for producing a stable acidic aqueous alumina sol containing elongate secondary particles having a dimension of 50 to 300 nm and which are elongated in only one plane and formed by edge-to-edge coagulation of rectangular plate-like primary particles having a length of one side of 10 to 30 nm when observed through an electron microscope, the process comprising the steps of:

(A) adding an alkali to an aqueous alumina sol containing fibrous colloidal particles of an amorphous alumina hydrate to produce a reaction mixture having a pH of 9 to 12;

(B) subjecting the reaction mixture obtained in the step (A) to a hydrothermal treatment at a temperature of 110 to 250° C. to produce an aqueous suspension containing an alumina hydrate having a boehmite structure; and (C) desalting the aqueous suspension obtained in the step (B) by adding water and an acid by ultrafiltration to form an acidic aqueous alumina sol having a pH of 3 to 6.

2. A process for producing a high-concentration and stable acidic aqueous alumina sol comprising the steps of:

mechanically dispersing a stable acidic aqueous alumina sol obtained by the process of claim 1; and concentrating the dispersed acidic aqueous alumina sol.

3. The process for producing a stable acidic aqueous alumina sol according to claim 1, wherein the alkali is at least one alkali selected from the group consisting of alkali metal hydroxides, alkali earth metal hydroxides, alkali metal aluminates, alkali earth metal aluminates, ammonium hydroxide, quaternary ammonium hydroxide, guanidine hydroxide and amines.

4. The process for producing a stable acidic aqueous alumina sol according to claim 1, wherein the alkali is sodium hydroxide.

5. The process for producing a stable acidic aqueous alumina sol according to claim 1, wherein the acid is at least one acid selected from the group consisting of nitric acid, hydrochloric acid, sulfuric acid, perchloric acid, acetic acid, formic acid and lactic acid.

6. The process for producing a stable acidic aqueous alumina sol according to claim 1, wherein the acid is acetic acid.

7. The process for producing a stable acidic aqueous alumina sol according to claim 1, wherein the secondary particles have a ribbon-like shape.

8. A process for producing a stable acidic aqueous alumina sol containing elongate secondary particles having a dimension of 50 to 300 nm and which are elongated in only one plane and formed by edge-to-edge coagulation of rectangular plate-like primary particles having a length of one side of 10 to 30 nm when observed through an electron microscope, the process comprising the steps of:

(a) adding an alkali to an aqueous alumina sol containing fibrous colloidal particles of an amorphous alumina hydrate to produce a reaction mixture having a pH of 9 to 12;

(b) subjecting the reaction mixture obtained in the step (a) to a hydrothermal treatment at a temperature of 100 to 250° C. to produce an aqueous suspension containing an alumina hydrate having a boehmite structure; and (c) contacting the aqueous suspension obtained in the step (b) to a hydrogen-type acid cation-exchange resin and a hydroxyl-type strong-base anion-exchange resin to form an acidic aqueous alumina sol having a pH of 3 to 6.

9. A process for producing a high-concentration and stable acidic aqueous alumina sol comprising the steps of:

mechanically dispersing a stable acidic aqueous alumina sol obtained by the process of claim 8; and concentrating the dispersed acidic aqueous alumina sol.

10. The process for producing a stable acidic aqueous alumina sol according to claim 8, wherein the alkali is at least one alkali selected from the group consisting of alkali metal hydroxides, alkali earth metal hydroxides, alkali metal aluminates, alkali earth metal aluminates, ammonium hydroxide, quaternary ammonium hydroxide, guanidine hydroxide and amines.

11. The process for producing a stable acidic aqueous alumina sol according to claim 8, wherein the alkali is sodium hydroxide.

12. The process for producing a stable acidic aqueous alumina sol according to claim 8, wherein the secondary particles have a ribbon-like shape.

13. A process for producing a stable acidic aqueous alumina sol containing elongate secondary particles having a dimension of 50 to 300 nm and which are elongated in only one plane and formed by edge-to-edge coagulation of rectangular plate-like primary particles having a length of one side of 10 to 30 nm when observed through an electron microscope, the process comprising the steps of:

(A') adding an alkali to an aqueous alumina sol containing fibrous colloidal particles of an amorphous alumina hydrate to produce a reaction mixture having a pH of 9 to 12;

(B') desalting the reaction mixture obtained in the step (A') by adding water by cake filtration to produce a desalted reaction mixture having a pH of 9 to 12;

(C') subjecting the desalted reaction mixture obtained in the step (B') to a hydrothermal treatment at a temperature of 110 to 250° C. to produce an aqueous suspension containing an alumina hydrate having a boehmite structure; and (D') adding an acid to the aqueous suspension obtained in the step (C') to form an acidic aqueous alumina sol having a pH of 3 to 6.

14. A process for producing a high-concentration and stable acidic aqueous alumina sol comprising the steps of:

mechanically dispersing a stable acidic aqueous alumina sol obtained by the process of claim 13; and concentrating the dispersed acidic aqueous alumina sol.

15. The process for producing a stable acidic aqueous alumina sol according to claim 13, wherein the alkali is at least one selected from the group consisting of alkali metal hydroxides, alkali earth metal hydroxides, alkali metal aluminates, alkali earth metal aluminates, ammonium hydroxide, quaternary ammonium hydroxide, guanidine hydroxide and amines.

16. The process for producing a stable acidic aqueous alumina sol according to claim 13, wherein the alkali is sodium hydroxide.

17. The process for producing a stable acidic aqueous alumina sol according to claim 13, wherein the acid is at least one alkali selected from the group consisting of nitric acid, hydrochloric acid, sulfuric acid, perchloric acid, acetic acid, formic acid and lactic acid.

18. The process for producing a stable acidic aqueous alumina sol according to claim 13, wherein the acid is acetic acid.

19. The process for producing a stable acidic aqueous alumina sol according to claim 13, wherein the secondary particles have a ribbon-like shape.

* * * * *